Figure 1:
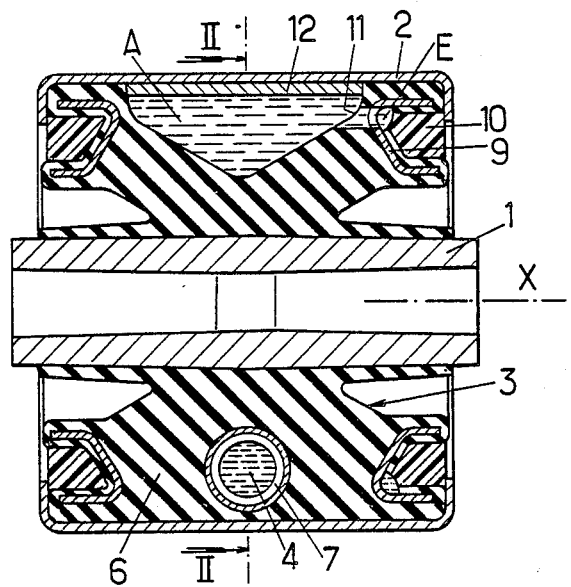

United States Patent [19]
Thelamon et al.

[11] Patent Number: 4,896,868
[45] Date of Patent: Jan. 30, 1990

[54] HYDRAULIC ANTIVIBRATORY SUPPORT SLEEVE

[76] Inventors: Jean Thelamon, 23, rue des Patis, Douy; Alain Vidal, 13, Impasse de Valcivieres, 63000 Clermont Ferrand, both of France

[21] Appl. No.: 301,698

[22] Filed: Jan. 26, 1989

[30] Foreign Application Priority Data

Jan. 28, 1988 [FR] France ................................ 88 00978

[51] Int. Cl.⁴ ...................... F16F 13/00; B60G 15/06; B60K 5/12
[52] U.S. Cl. .................................. 267/140.1; 267/219
[58] Field of Search .......................... 267/140.1–141.7, 267/219–220, 35; 180/300, 312, 902; 248/562, 636, 638; 123/192 R, 195 R; 188/320

[56] References Cited

U.S. PATENT DOCUMENTS

| 4,705,410 | 11/1987 | Broock ........................ 267/141.2 X |
| 4,728,086 | 3/1988 | Ishiyama et al. ................. 267/140.1 |
| 4,756,514 | 7/1988 | Kanda ............................ 248/562 X |
| 4,768,760 | 9/1988 | Le Fol ........................... 267/219 X |
| 4,786,036 | 11/1988 | Kanda ............................ 248/636 X |
| 4,790,520 | 12/1988 | Tanaka et al. .................. 248/636 X |

FOREIGN PATENT DOCUMENTS

| 0172700 | 2/1986 | European Pat. Off. . |
| 0168931 | 9/1985 | Japan ................................. 267/140.1 |
| 0206838 | 9/1986 | Japan ................................. 267/219 |
| 0088834 | 4/1987 | Japan ................................. 248/562 |

Primary Examiner—Douglas C. Butler
Attorney, Agent, or Firm—Larson and Taylor

[57] ABSTRACT

The invention provides a hydraulic antivibratory support sleeve comprising two rigid tubular frames (1, 2), one surrounding the other and joined together by an elastomer body (3) adhered thereto and shaped so as to form therewith at least two sealed chambers (A, B) diametrically opposite in a direction Y separated from each other by a central dividing wall (6) and communicating together through a narrow channel (E), the assembly of the chambers and the channel being filled with a liquid. One at least of the sections, of its central dividing wall (6), separating the two chambers and connecting the two frames together is formed with a well (5) extending in direction Y, causing the two chambers (A and B) to communicate with each other, which well is closed by a mobile or deformable valve (4) associated with a device for limiting the amplitude of its deflections.

8 Claims, 2 Drawing Sheets

HYDRAULIC ANTIVIBRATORY SUPPORT SLEEVE

The invention relates to hydraulic antivibratory support sleeves comprising two rigid tubular frames, one surrounding the other and preferably of revolution at least partially, coaxial and concentric at least under load, which frames are joined together by an elastomer body sealingly connected thereto and shaped so as to form therewith at least two sealed chambers diametrically opposite in a direction Y and communicating together through a narrow channel, the assembly of said chambers and said channel being filled with a liquid.

Such sleeves are intended to be fitted for support and damping purposes between two rigid parts which can be fixed respectively to the two frames and able to undergo, with respect to each other, oscillations oriented in the diametrical direction Y, the assembly being adapted so that, for some at least of these oscillations, the liquid is driven alternately from one of the chambers to the other and conversely through the narrow channel, which creates in this liquid, for certain frequencies of the oscillations, a resonance phenomenon capable of damping the transmission of these oscillations from one of the frames to the other.

Sleeves with diametrical deflection of the kind in question are for example intended to be fitted between a vehicle chassis and the internal combustion engine or the rear or front undercarriage of this vehicle.

To fulfil the above mentioned support and damping functions, another type of hydraulic device is known with axial and not diametrical deflection, having a construction of revolution about a generally vertical axis, the direction in which the oscillations to be damped appear being that of this axis.

These supports still comprise two sealed deformable chambers communicating together through a narrow channel, one of these two chambers, generally defined outwardly by a thick truncated cone shaped wall, being called "work chamber", whereas the other, essentially defined by a flexible foil, is called "compensation chamber".

It has been proposed to equip these other supports with "high frequency decoupling" means, i.e. for filtering out the vibrations of relatively low amplitude (generally less than 0.5 mm) and of relatively high frequency (generally greater than 15 Hz) such as those due to the operation of a vehicle internal combustion engine.

These means comprise a mobile or deformable "valve" defining a portion of the work chamber, this portion being possibly situated at the level of the external wall of said chamber or at the level of a central dividing wall separating the two chambers, as well as means for limiting the amplitude of the deflection of said valve to a low value, more particularly about 0.5 mm.

Attempts have been made to apply such a decoupling arrangement to sleeves with diametrical deflection such as those defined above.

Thus, the European patent 0 172 700 has proposed forming a portion of the external wall of one of the two chambers of such a sleeve by means of a deformable membrane imprisoned between two rigid grids for limiting its deflection.

Such a solution has the drawback that, should there be breakage or leaking of the membrane, the liquid contained in the sleeve escapes outwardly, which makes the sleeve inoperative.

Because of the particular construction of sleeves with diametrical deflection, it was not considered possible up to the present to adopt for such sleeves the solution of the central valve known for axial deflection supports.

The central dividing wall separating the two pockets of these sleeves is in fact formed by the rigid internal tubular frame and by two short and thick deformable sections extending this frame diametrically on each side and connecting the two frames together: no position was then a priori available in such a dividing wall for receiving the above central valve.

An object of the invention is then to make it possible to adopt such a central valve in hydraulic antivibratory sleeves of the kind considered with diametrical deflection.

For this, the sleeves of the kind in question in accordance with the invention are essentially characterized in that one at least one of the sections, of their central dividing wall, connecting the two frames together is formed with a well extending in direction Y, independent of the narrow channel and sufficiently wide to cause the two chambers to communicate freely with each other, which well is closed by a mobile or deformable valve of the above kind.

In preferred embodiments, recourse is further had to one and/or other of the following arrangements:

for a sleeve of the above kind whose external tubular frame has an external diameter between 5 and 12 cm, the overall cross section of the valves closing the wells is between 0.75 and 3 $cm^2$, the portion of the elastomer body which defines one at least of the chambers has, in axial section, the general shape of a V open radially outwardly, the well is formed in an elastomer portion of the central dividing wall, the well of the preceding paragraph is provided with two cylindrical rings aligned axially in direction Y with interpositioning of the valve, with or without clearance, the well is formed in a rigid bar forming the diametrically external portion of the central dividing wall, each bar according to the preceding paragraph is formed by two half bars juxtaposed one against the other in direction Y, each half bar according to the preceding paragraph forms part of a rigid arcuate frame comprising at least two hoops which extend along the axial ends of the internal face of the external frame.

Apart from these arrangements the invention comprises certain other arrangements which are preferably used at the same time and which will be more explicitly described hereafter.

In what follows, two preferred embodiments of the invention will be described with reference to the accompanying drawings in a way which is of course in no wise limiting.

Figure 2:
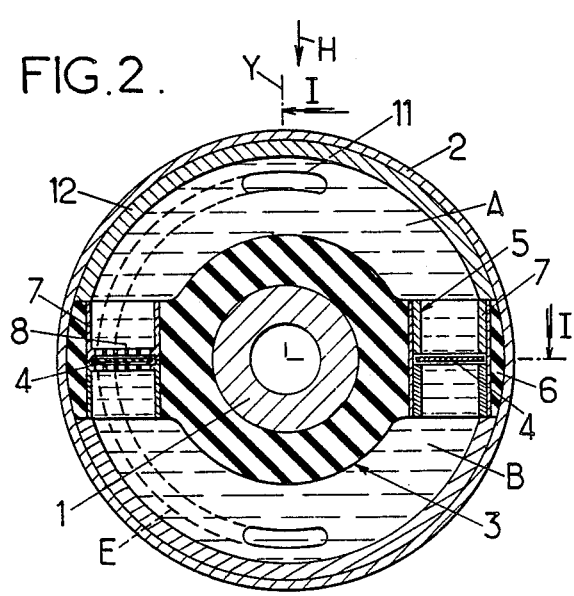
Figure 3:
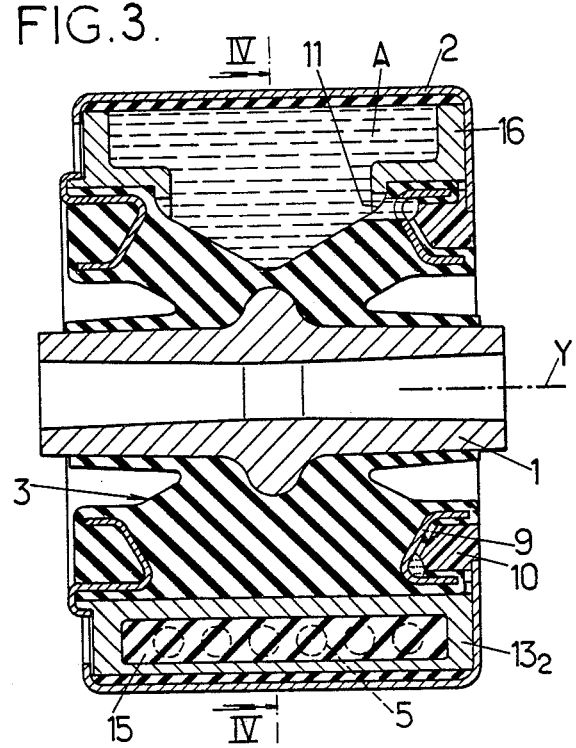
Figure 4:
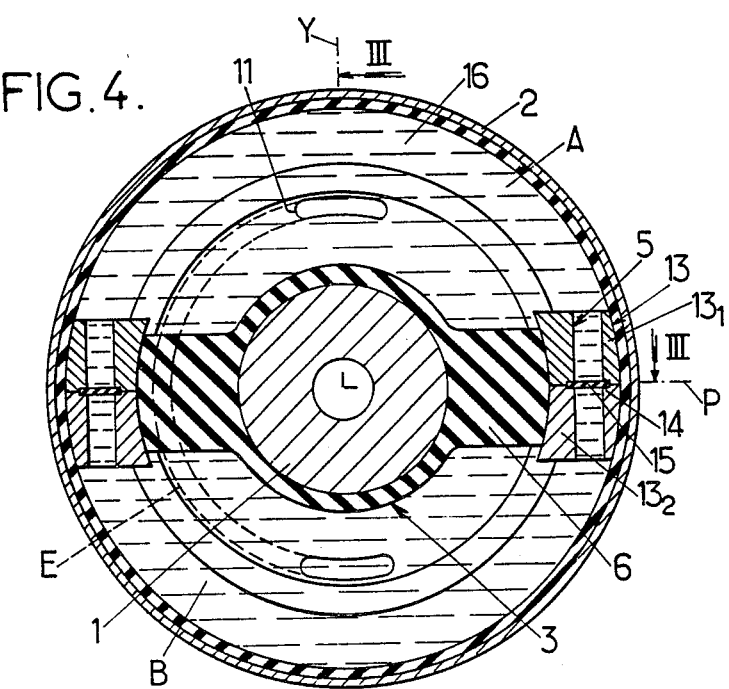

FIGS. 1 and 2, of these drawings, show a first hydraulic antivibratory support sleeve constructed in accordance with the invention, respectively in axial section through I—I of FIG. 2 and in cross section through II—II of FIG. 1;

FIGS. 3 and 4 show a second sleeve also in accordance with the invention, respectively in axial section through III—III in FIG. 4 and in cross section through IV—IV in FIG. 3.

In a way known per se, the support sleeve in each case comprises:

an internal metal tubular frame of revolution 1 whose axis X is generally horizontal, an external tubular metal frame of revolution 2 coaxial with frame 1 at least for the assembled and loaded condition of the sleeve and surrounding this frame 1, and an elastomer body 3 connecting the two frames 1 and 2 together while forming therebetween two sealed pockets or chambers A, B, diametrically opposite in a general vertical direction Y.

The internal frame 1 is intended to be secured to a pin (not shown) which passes jointly through it whereas the external frame 2 is intended to be secured to a bearing (not shown), this pin and this bearing being fixed respectively to two rigid elements between which it is desired to fit an antivibratory support, elements such as a vehicle engine or suspension arm and the chassis of this vehicle.

The two chambers A and B communicate together through a narrow channel E which will be described further on.

These two chambers and the narrow channel E are filled with a liquid L.

Such a support sleeve operates as follows.

At rest, the sleeve is in its condition illustrated in the drawings.

If, from this situation, a force is applied in direction Y as shown by arrow H on the external frame 2 with respect to the internal frame 1, chamber A retracts under crushing whereas on the other hand chamber B expands; the liquid L initially contained in chamber A is then driven to chamber B through the narrow channel E.

This effect is reversed when a force is exerted on frame 2 in a direction opposite the preceding one.

The alternation of such forces is generally renewed at a certain frequency and, for a value $F_o$ of this frequency which is predetermined and related to the dimensions of the narrow channel E, and in particular to the ratio between its cross section and its length, the liquid mass flowing in this channel is caused to resonate and the support then exerts an excellent damping effect on the transmission of the oscillations from one of the frames to the other.

The improvement provided by the present invention to sleeves of the above kind makes it possible to "decouple" with respect to certain high frequencies, i.e. to filter out directly certain vibrations of relatively high frequency and relatively low amplitude without causing any flow of liquid L in the narrow channel E.

In each case, a vibrating valve 4 is used for this purpose mounted so that:

its deflections are controlled by application of pressures on respectively two of its opposite faces, these faces are in free and direct contact with respectively the liquid volumes contained in the two chambers A and B, the amplitude of said deflections is limited to a low value.

More precisely, in each case, this valve closes a bore or "well" 5 itself formed in the portion, of wall 6 separating the two chambers A and B, which is included between the two frames 1 and 2.

Well 5 has a sufficient cross section for complying with the two following conditions:

no choking or resonance effect is observed in it of the kind observed in the narrow channel E, the transverse area of the whole of valves 4 is sufficient for the liquid volume L displaced by their deflections to correspond to that displaced by the deformations of body 3 due to the vibrations to be filtered out.

In usual embodiments, for which the external diameter of the external frame is of the order of 6 to 12 cm, the overall area of the valves is between 0.75 and 3 cm$^2$.

Well 5 has preferably the form of a cylinder of revolution whose axis is parallel to direction Y.

In the embodiment illustrated in FIGS. 1 and 2, well 5 is formed in an elastomer portion of wall 6.

This well is fitted with two cylindrical rings 7 disposed in the axial extension of each other with interpositioning of valve 4.

This valve is in the form of a rigid circular disc formed from a plastic material such as a superpolyamide.

The form and fitting of rings 7 are designed so as to allow small amplitude deflections of valve 4 parallel to direction Y, the maximum value of this amplitude being preferably of the order of 0.5 mm.

In the embodiment shown on the right of FIG. 2, the external diameter of valve 4 is a little larger than the internal diameter of rings 7 and the axial spacing thereof is slightly greater than the thickness of the valve, so that the latter may move axially between the facing edges of the two rings.

In the embodiment shown on the left of FIG. 2, each ring 7 is strengthened by a grid 8 in the vicinity of one of its axial ends and valve 4 is mounted loosely in the cage defined by these two grids and by these ends after axial juxtapositioning of the two rings.

The elastomer body 3 is here such that the axial section of each pocket has the general shape of a V open radially outwardly: in other terms, this body is formed in the fashion of a diabolo having two conical halves converging towards the centre.

Such a form is advantageous in that it makes possible relatively large resilient deformation of the sleeve, resulting in relatively high mutual slants of the axes of its two frames which are coaxial at rest.

The narrow channel E is formed in one at least of the large bases of the diabolo and extends over an arc of a circle with axis X, which arc has an angular extent of about 180°.

Said channel E is defined by a metal shroud 9 (FIG. 1) carried by said base and open axially outwardly of the sleeve and by a rigid plastic material filling 10 introduced in this shroud and not filling it completely.

At both its ends, channel E opens respectively into the two chambers A and B through appropriate apertures 11.

Rigid frames 12 can be further seen in FIGS. 1 and 2 in the form of partially cylindrical tiles which are mounted in each of chambers A and B while extending jointly along the inner face of the external frame 2 and the purpose of which is to consolidate the sleeve assembly so as to avoid deformation of the elastomer body 3.

The "high frequency decoupling" operation of such a sleeve is the following.

When a low amplitude vibration (namely generally less than 0.5 mm) and of relatively high frequency (greater than 15 Hz and for example of the order of 50, 100 or 150 Hz) is applied to one of the two frames 1 and 2, it causes valve 4 to vibrate and this phenomenon is sufficient to provide a filtering effect preventing the transfer of the vibrations from the frame considered to the other frame.

If the amplitude of the vibrations considered exceeds the threshold value imposed by the end of travel stops of the valve, the liquid is forced to flow through the narrow channel E and we find the other damping operating mode of the sleeve, reserved more especially for low frequency oscillations, which mode causes resonance of the liquid flowing through the narrow channel.

In the second embodiment illustrated in FIGS. 3 and 4, the components which are identical or comparable to those described above in connection with FIGS. 1 and 2, have been given the same references.

The sleeve of this variant differs from the preceding one in that wells 5 have not been formed in the deformed portions of the separating wall 6, but in rigid portions 13 extending these deformed portions outwardly.

These rigid portions 13 are here in the form of bars each formed of two half bars $13_1$ and $13_2$ juxtaposed one against the other in direction Y.

The assembly is adapted so that, at the time of such juxtapositioning, the two bores forming each well are aligned and an annular groove 14 is formed therebetween, which groove is adapted for jointingly receiving the periphery of an elastic and sealing membrane forming valve 15. Means are provided for limiting the amplitude of the deflections of this membrane 15, means such as a fabric incorporated therein.

Plane P in which the two half bars $13_1$ and $13_2$ are juxtaposed is the plane passing through the axis X which is perpendicular to the direction Y.

The two half bars situated on the same side of plane P are joined together by two semicircular hoops 16 forming, with these half bars, the same moulded one-piece frame.

This frame here has the maintenance role which was played by tiles 12 in the preceding embodiment.

This variant it is true leads to adopting for the external tubular frame 2 a larger diameter than for the preceding embodiment.

But in this variant, at the level of bars 13, a relatively large dimension is available in the direction of axis X and the cut-outs in this bar do not risk weakening the support, so that the wells 15 may have a large dimension parallel to said axis X.

This is what has been shown in FIG. 4, in which well 5 is formed of six cylindrical bores of revolution formed parallel to the direction of axis X, the groove 14 into which all these bores open being common to them all and then having a rectangular shape elongate in the direction of axis X.

The operation of this sleeve for "high frequency decoupling" is similar to that described above except that the deflections of all of the preceding valve 4 are here replaced by deflections or deformations of central portions of membrane 15.

Following which and whatever the embodiment adopted, antivibratory support sleeves are obtained whose construction and operation follow sufficiently from the foregoing.

These sleeves have numerous advantages with respect to those known heretofore, in particular that of providing efficient "high frequency decoupling" without any risk of liquid leaking outwardly of the sleeve at the very level of the valve or its seat.

As is evident, and as it follows moreover from what has gone before, the invention is in no wise limited to those of its modes of application and embodiments which have been more especially considered; it embraces, on the contrary, all variants thereof, particularly those where the narrow channel connecting the two chambers A and B of the sleeve together is located in a part of the sleeve other than the large base of one of the cones and those where, with the valves formed of rigid discs adapted to beat against two seats, means are provided, such as rubber cushions mounted on these discs and/or on the seats, for avoiding the contact noises between discs and seats.

We claim:

1. Hydraulic antivibratory support sleeve comprising two rigid tubular frames (1, 2), one surrounding the other and joined together by an elastomer body (3) sealingly connected thereto and shaped so as to form therewith at least two sealed chambers (A, B) diametrically opposite in a direction Y separated from each other by sections of a central dividing wall (6) and communicating together through a narrow channel (E), the assembly of said chambers and said channel being filled with a liquid, characterized in that one at least of the sections of said central dividing wall (6) connecting the two frames (1 and 2) together is formed with a wide well (5) extending in direction Y, independent of the narrow channel (E) and sufficiently wide to cause the two chambers (A and B) to communicate freely with each other, which well is closed by a deflectable valve (4; 15) of relatively large transverse area associated with means for limiting the amplitude of the deflections of said valve.

2. Support sleeve according to claim 1, whose external tubular frame has an external diameter between 5 and 12 cm, characterized in that there are at least two of said deflectable valves disposed in a respective said well and that the overall cross section of the valves (4, 15) closing the associated said wells (5) is between 0.75 and 3 cm$^2$.

3. Support sleeve according to claim 1, characterized in that the portion of the elastomer body (3) which defines one at least of the chambers (A, B) has, in axial section, the general shape of a V open radially outwardly.

4. Support sleeve according to claim 1, characterized in that the well (5) is formed in an elastomer portion of the central dividing wall (6).

5. Support sleeve according to claim 4, characterized in that the well (5) is provided with two cylindrical rings (7) aligned axially in direction Y with interpositioning of the valve (4, 15).

6. Support sleeve according to claim 1, characterized in that the well (5) is formed in a rigid bar (13) forming the diametrically external portion of the central dividing wall (6).

7. Support sleeve according to claim 6, characterized in that each bar (3, 13) is formed by two half bars ($13_1$, $13_2$) juxtaposed one against the other in direction Y.

8. Support sleeve according to claim 7, characterized in that each half bar forms part of a rigid arcuate frame comprising at least two hoops (16) which extend along the axial ends of the internal face of the external frame (2).

* * * * *